(12) United States Patent
Simske et al.

(10) Patent No.: US 11,454,951 B2
(45) Date of Patent: Sep. 27, 2022

(54) CUSTOMIZED PRODUCTION

(71) Applicant: Hewlett-Packard Development Company, L.P., Spring, TX (US)

(72) Inventors: Steven J. Simske, Fort Collins, CO (US); Guy Adams, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 89 days.

(21) Appl. No.: 16/470,880

(22) PCT Filed: Jan. 31, 2017

(86) PCT No.: PCT/US2017/015809
§ 371 (c)(1),
(2) Date: Jun. 18, 2019

(87) PCT Pub. No.: WO2018/143934
PCT Pub. Date: Aug. 9, 2018

(65) Prior Publication Data
US 2020/0089193 A1 Mar. 19, 2020

(51) Int. Cl.
*G05B 19/418* (2006.01)
*G05B 19/4099* (2006.01)

(52) U.S. Cl.
CPC ..... *G05B 19/4099* (2013.01); *G05B 19/4183* (2013.01); *G05B 19/41845* (2013.01); *G05B 2219/49023* (2013.01)

(58) Field of Classification Search
CPC .......... G05B 19/4099; G05B 19/41845; G05B 19/4183; G05B 2219/49023; G05B 2219/35152; Y02P 90/02; B33Y 80/00; B33Y 50/02; B29C 64/112; B29C 64/393; B29C 67/0088; B29C 64/118; B41J 2/32
(Continued)

(56) References Cited

U.S. PATENT DOCUMENTS 6,259,056 B1 7/2001 Cowden
6,698,158 B2 3/2004 Spatafora
(Continued)

FOREIGN PATENT DOCUMENTS

CN 103300472 B 8/2014
CN 105034365 A 11/2015
(Continued)

OTHER PUBLICATIONS

Volvo Trucks Cuts Production Time by 94% & Costs with Stratasys 3D Printing Systems < https://3dprint.com/52007/volvo-trucks-3d-print-parts/ >.

*Primary Examiner* — Michael W Choi
(74) *Attorney, Agent, or Firm* — Fabian VanCott

(57) ABSTRACT

An example system includes a standardized production portion to provide a set of standardized components and a customized production portion to provide a set of customized components. Each standardized component of the set of standardized components is substantially identical to one another, and each customized component of the set of customized components is selected from at least two different custom options. Each customized component includes at least a first portion of a customized part and an associated descriptor. Each customized component is physically coupled to a standardized component.

16 Claims, 5 Drawing Sheets

(58) Field of Classification Search
USPC .......................................................... 700/118
See application file for complete search history.

(56) References Cited

U.S. PATENT DOCUMENTS

| | | | |
|---|---|---|---|
| 7,766,641 B2 | 8/2010 | Silverbrook | |
| 2001/0008314 A1* | 7/2001 | Tanaka | B29C 33/38 |
| | | | 264/2.5 |
| 2009/0248184 A1* | 10/2009 | Steingart | G06F 3/016 |
| | | | 700/98 |
| 2014/0214684 A1 | 7/2014 | Pell | |
| 2015/0129437 A1* | 5/2015 | Clamp | B65D 81/22 |
| | | | 53/445 |
| 2015/0239270 A1* | 8/2015 | Attia | G10C 3/12 |
| | | | 347/110 |
| 2015/0253585 A1* | 9/2015 | Anatole | B33Y 10/00 |
| | | | 264/1.7 |
| 2016/0016321 A1 | 1/2016 | Rus et al. | |
| 2016/0280403 A1* | 9/2016 | Colson | B29C 64/386 |
| 2017/0212277 A1* | 7/2017 | Chapoy | G02C 7/049 |
| 2018/0207863 A1* | 7/2018 | Porter | B29C 64/241 |
| 2018/0306648 A1* | 10/2018 | Park | B65D 65/38 |

FOREIGN PATENT DOCUMENTS

| | | | |
|---|---|---|---|
| CN | 105094088 A | 11/2015 | |
| EP | 2705942 A1 | 3/2014 | |
| RU | 2172102 C1 | 8/2001 | |

\* cited by examiner

CUSTOMIZED PRODUCTION

BACKGROUND

Many products are produced using mass-production techniques. Such methods can include, for example, assembly lines in which different components are assembled to form the final product. Such mass production can be used to manufacture products ranging from, for example, small toys to large automobiles or automobile parts.

BRIEF DESCRIPTION OF THE DRAWINGS

For a more complete understanding of various examples, reference is now made to the following description taken in connection with the accompanying drawings in which.

DETAILED DESCRIPTION

Various examples provide for mass production of customized parts in a standardized manner. For example, a standardized framework, such as a packaging or production framework, may be provided in in an assembly line manner. The standardized framework may also include a standardized part. The standardized framework may be formed to accept one of a set of customized parts which may be introduced into the mass production process. In some examples, the customized parts can be produced using 3D printing. Further, the customized parts may be accompanied with associated descriptors. For example, trademark or patent information, instructions, warranty information, a collector card, reward information or safety information associated with the customized part may be provided along with the customized part. The descriptors may also be produced using 3D printing. In some examples, supplemental customized parts, such as test equipment, may be provided that are associated with either the customized part or the standardized framework.

As described above, mass production can be used to manufacture products ranging from, for example, small toys to large automobiles or automobile parts. In general, mass production is used to generate a large number of products that are identical to each other. For example a single mass production system (e.g., an assembly line) may be used to produce a single standardized object, such as a part or tool, for example. A separate mass production system may be needed to produce a different part or tool, even if the products are only slightly different from those produced on the first assembly line. Alternatively, customization of the standardized part or tool may be performed offline, or outside the mass production. Doing so may require removal of each instant of the product from the mass production system and, possibly, re-inserting into the mass production system at a later point, resulting in inefficiencies in time and cost. Various example described herein allow for the customization of a standardized component without removal from the mass production system.

Figure 1:
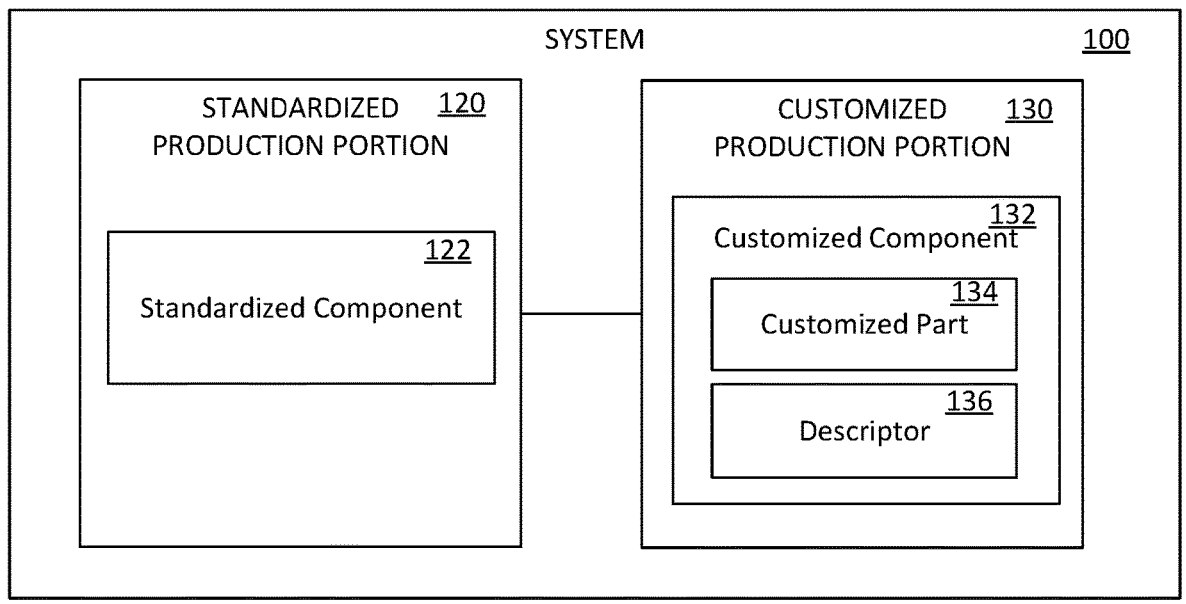
FIG. 1 is a schematic illustration of an example system for customized production in a mass production arrangement.

Referring now to the figures, FIG. 1 provides a schematic illustration of an example system for customized production in a mass production arrangement. The example system 100 of FIG. 1 includes a standardized production portion 120 to provide a set of standardized components 122. The standardized production portion 120 may provide or produce the set of standardized components 122 by, for example, placing one standardized component of the set of standardized components 122 onto a conveyor. Each standardized component of the set of standardized components 122 is substantially identical to one another.

The example system 100 further includes a customized production portion 130 to provide a set of customized components 132. Each customized component 132 of the set of customized components 130 is selected from at least two different custom options. Examples of custom options for one set of customized components is described below with reference to FIG. 3. Each customized component 132 includes at least a part of a customized part 134 and an associated descriptor 136. Examples of various descriptors 136 are described below with reference to FIG. 4. Each customized component from the set of customized components 132 is physically coupled to a standardized component from the set of standardized components 122 to, for example, for a final product.

Figure 2:
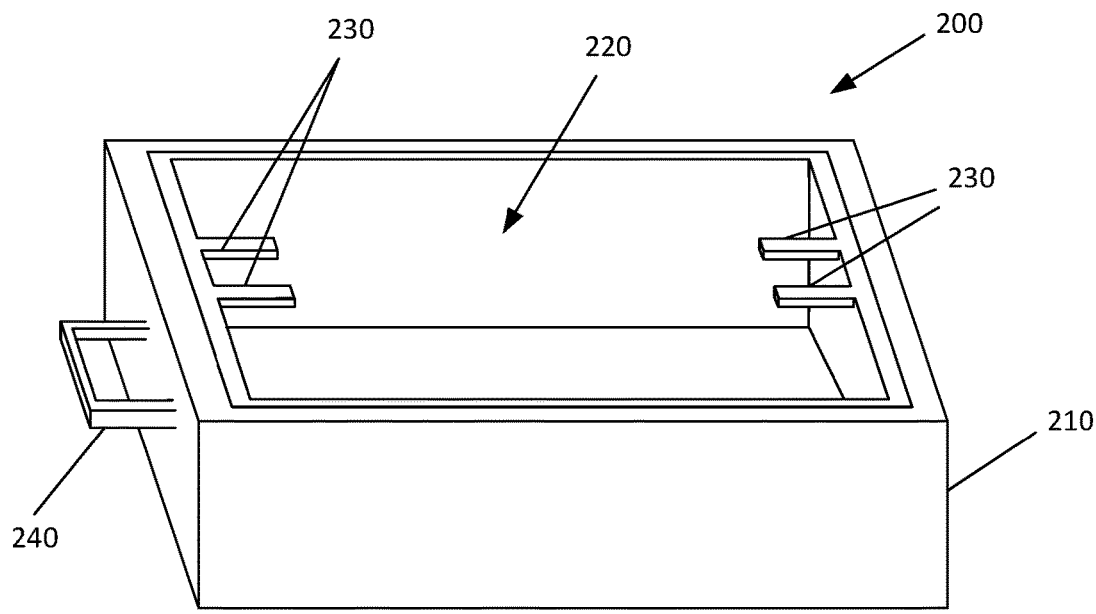
FIG. 2 is a perspective view of an example standardized component in a mass production arrangement.

Referring now to FIG. 2, a perspective view of an example standardized component 200 in a mass production arrangement is illustrated. The mass production arrangement may be for the production of a particular product or set of products. In this regard, the example standardized component 200 of FIG. 2 includes a body 210 which forms a cavity 220 to house the product. The cavity may be sized according to the size of the product, and various sizes are possible and are contemplated.

The example standardized component 200 is provided with various interface features 230 that allow for physically coupling of the standardized component 200 with the product. In the example of FIG. 2, the interface features 230 take the form of fingers or extensions protruding into the cavity. Of course, in other examples, the interface features 230 may take any of a variety of other forms, such as indentations, grooves, notches, or the like, each of which is contemplated within the scope of the present disclosure.

In some examples, the interface features 230 may include multiple interface positions. In this regard, the standardized component 200 may be physically coupled with different products or different sizes and shapes, for example.

In various examples, the standardized component 200 may form a framework for an object, such as a tool or a part, for example. For example, the example standardized component 200 may be used as a packaging framework which may be used as the final packaging for a product that may be ready for shipment or display. In some examples, the standardized component 200 may include the object, or a portion thereof, that is intended for packaging or production. The object may be placed or formed within the cavity 220.

In some examples, the example standardized component 200 may be used as a production framework which may be used to secure a product during various phases of production and/or post production. In this regard, the example standardized component 200 of FIG. 2 is provided with a fitting 240 which may be used for interfacing the standardized component 200 with, for example, robotic arms or the like during the production process. In the example standardized component 200 of FIG. 2, the fitting 240 is formed as a handle. In this example, the fitting 240 may be easily interfaced (e.g., grasped) by a robotic arm (e.g., for automated manufacturing) during transfer from one production phase to another. Further, the fitting 240 may be used to couple the example standardized component 200 with a post-processing system, such as a cleaning or packaging system, for example. In this regard, the example fitting 240 may be standardized to accommodate the various post-production processes. For example, the example fitting 240 may be formed with mechanical properties to protect an object during post production, such as during cleaning, shipping or handling. In some examples, other portions of the standardized component 200 or the entire standardized component 200 may facilitate such post-production processes.

The example standardized component 200 may be formed in any of a variety of manners. In one example, the standardized component 200 may be formed of a plastic using an injecting molding process. In other examples, the example standardized component 200 may be formed using a three-dimensional (3D) printing process.

Figure 3:
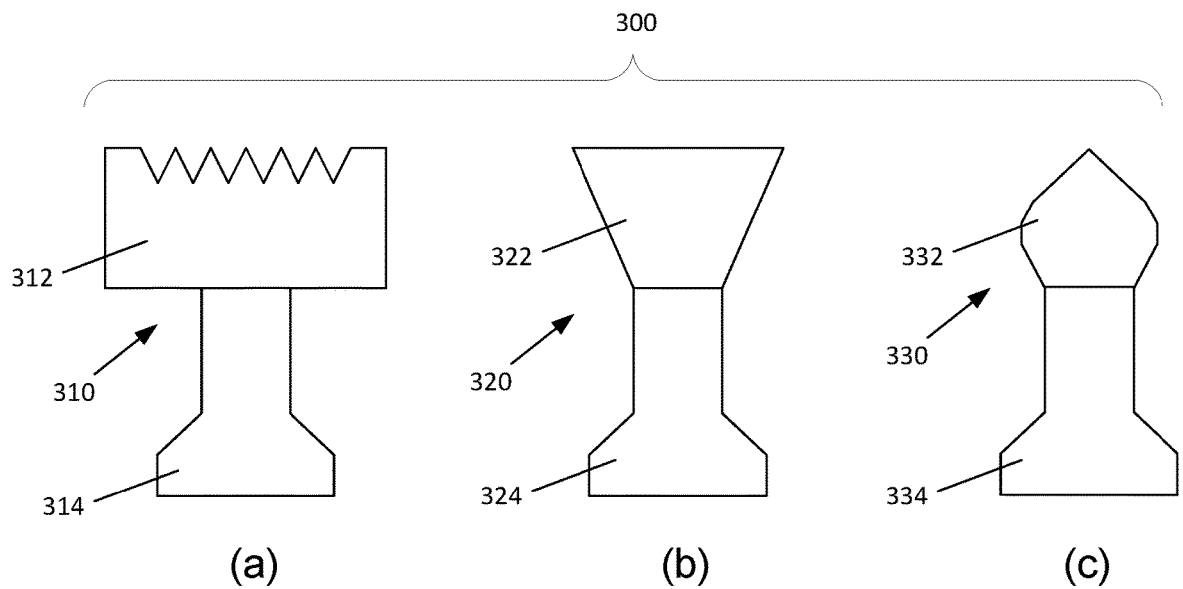
FIG. 3 illustrates an example set of customized components.

As noted above, in various examples, a mass production system may include coupling of a standardized component, such as the example standardized component 200 of FIG. 2, with a customized component. The customized component may be selected from a set of customized components and selected from at least two different custom options. Referring now to FIG. 3, an example set of customized components is illustrated.

The example set of customized components 300 of FIG. 3 is illustrated with three options for a customized component. For illustrative purposes only, FIG. 3 shows three options for tools, including a rake 310, a shovel 320 or a spade 330. In the example of FIG. 3, each customized component 310, 320, 330 of the set of customized components 300 includes a first part 312, 322, 332 and a second part 314, 324, 334. Of course, in other examples, the customized components 310, 320, 330 may have a single part or any number of parts that may be physically connected. Further, in the example of FIG. 3, each customized component 310, 320, 330 of the set of customized components 300 includes a part that is identical in two or more options. For example, the second part 314, 324, 334 of each of the customized components 310, 320, 330 is a substantially identical handle. In other examples, the different options for the customized components may have none, one or more common parts.

Each of the example customized components 310, 320, 330 of FIG. 3 may be integrated with the example standardized component 200 of FIG. 2 or other standardized component. In various examples, the integration of the example customized component 310, 320, 330 may be performed in a conventional manufacturing environment, such as an assembly line. In other examples, the example customized component 310, 320, 330 and a standardized component may be formed together by, for example, a 3D printing process.

In some examples, supplemental customized parts may be provided that are associated with either the example customized component 310, 320, 330 or an example standardized component. For example, the supplemental customized part may include a test equipment (e.g., dog bone) or various attachments for the customized component.

Figure 4:
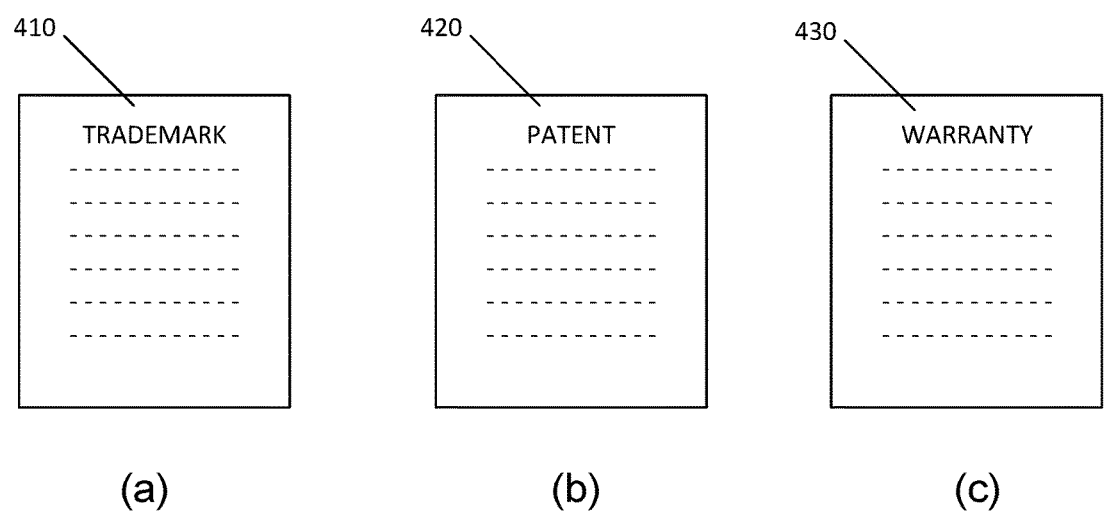
FIG. 4 illustrates various examples of descriptors.

As noted above, various customized components may include a descriptor associated with a customized component. In this regard, FIG. 4 illustrates various examples of descriptors that may be associated with various customized components. Various descriptors may include intellectual property information related to the customized component, the standardized component or both. In other examples, a descriptor may provide identification, tracking or authentication of, for example, the customized component, the standardized component or both. For example, a barcode or other identifier may be provided to allow for authentication of the component or its source. In this regard, an example descriptor may include text or symbols associated with trademark information 410 or patent information 420, for example. In other examples, a descriptor may provide warranty information 430 associated with the customized component, the standardized component or both. For example components with structural or safety properties, the descriptor may include information regarding the desired properties of a replacement part. Various other types of descriptors are possible and are contemplated within the scope of the present disclosure. In various examples, a selected custom option associated with the customized component may be associated with one, two or more descriptors.

Figure 5:
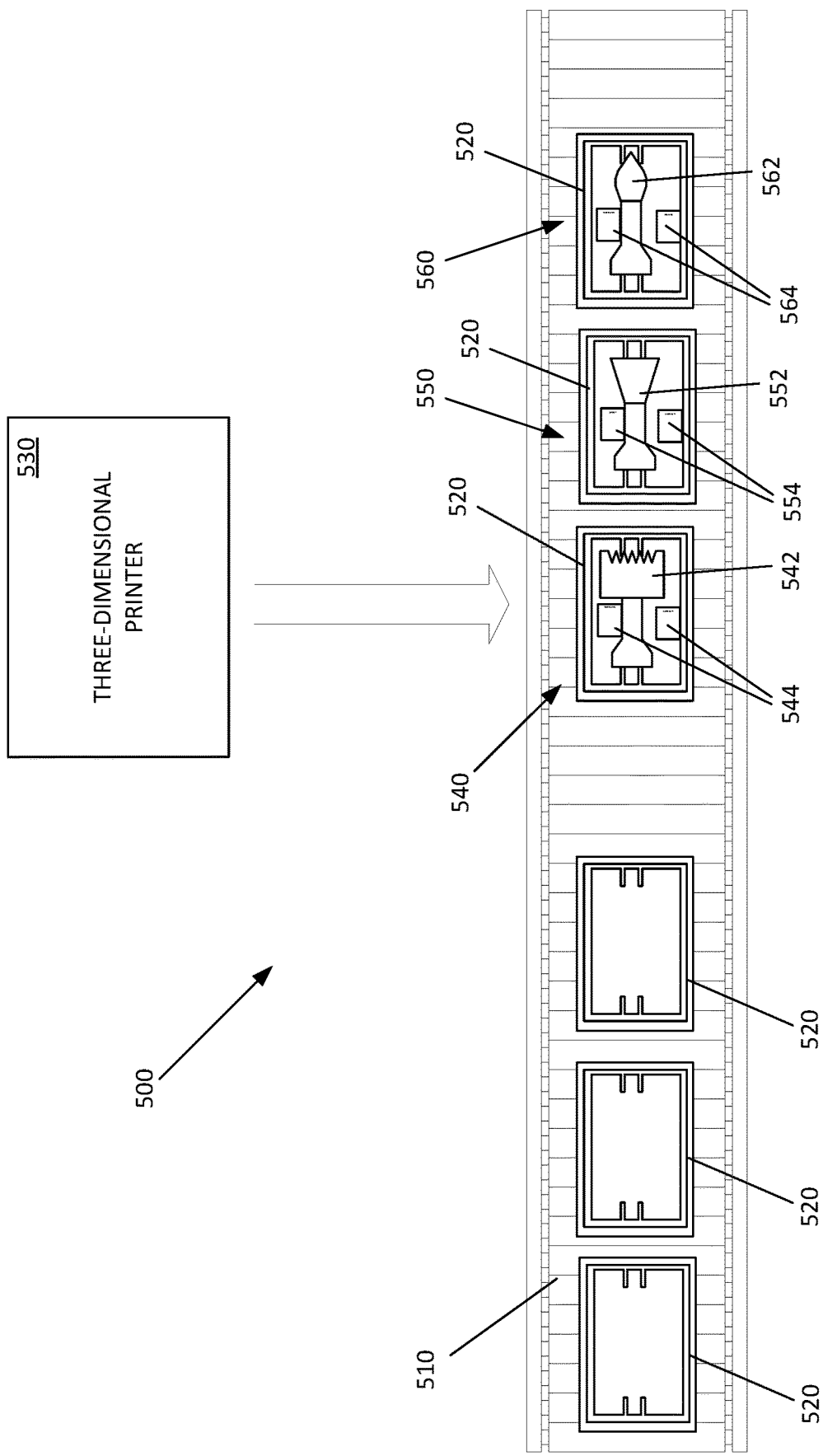
FIG. 5 illustrates an example system for mass production of a product with a customized component.

Referring now to FIG. 5, an example system for mass production of a product with a customized component is illustrated. The example system 500 may include a conveyor system, such as a conveyor belt 510 to move among different phases of assembly of a final product. In other examples, automated robotic equipment may be used to move through different phases of assembly, for example.

In the example illustrated in FIG. 5, an assembly phase includes providing of a set of standardized components 520. The standardized components 520 may be similar to the standardized component described above with reference to FIG. 2. As illustrated in the example of FIG. 5, standardized components 520 may be placed one at a time on the conveyor 510. The standardized components 520 are substantially identical to one another.

As the mass production system moves forward, a customized component selected from a set of customized components (e.g., a set of custom options) is added to each standardized component. In the example of FIG. 5, each of three assembled products 540, 550, 560 is shown with a standardized component 520 and a different customized component 542, 552, 562. In this regard, each customized component 542, 552, 562 is coupled to the associated standardized component 520 at, for example, the interface features 230 described above with reference to FIG. 2.

For the assembled products 540, 550, 560, the customized component further includes at least one descriptor 544, 554, 564. The descriptor 544, 554, 564 may be physically coupled to either the customized component 542, 552, 562. In other examples, the descriptor 544, 554, 564 is physically coupled to the standardized component 520. In the example of FIG. 5, one descriptor 544, 554, 564 is coupled to each of the standardized component 520 and to the customized component 542, 552, 562. The descriptors 544, 554, 564 may include text or other printed matter provided on a leaf that is attached to the standardized component 520, for example. In various example, the descriptors 544, 554, 564 may include text printed with standard ink. In other examples, the descriptors 544, 554, 564 may include text or images formed in relief, for example.

In the example of FIG. 5, each assembled product 540, 550, 560 is provided with two descriptors 544, 554, 564, but any number of descriptors may be provided as needed. As noted above, each assembled product 540, 550, 560 may be provided with descriptors 544, 554, 564 based on the custom option selected for the customized component 542, 552, 562. For example, the first assembled product 540 may be provided with a warranty descriptor and a trademark descriptor, while the second assembled product 550 may be provided with a patent descriptor and a rebate descriptor.

In one example, as illustrated in FIG. 5, the customized components 542, 552, 562 are formed into a corresponding standardized component 520 using a 3D printer 530. In this regard, instructions may be provided to the 3D printer indicating the custom option to be formed for each standardized component 520. Thus, the customized component 542, 552, 562, including corresponding descriptors 544, 554, 564 may be dynamically selected and printed within the mass production system 500. Thus, customization in a standardized mass production system may be achieved without removal of each product from the mass production system. For example, the standardized component 520 may include packaging with a customized part (e.g., customized component 542, 552, 562) inserted therein.

In the example of FIG. 5, the formation of the assembled products 540, 550, 560 are shown as occurring sequentially. In other examples, the assembled products 540, 550, 560 may be formed without any such sequence. For example, using a 3D printing process, the assembled products 540, 550, 560 may be formed by simultaneously printing layers of the standardized components 520 and the appropriate customized component 542, 552, 562.

Figure 6:
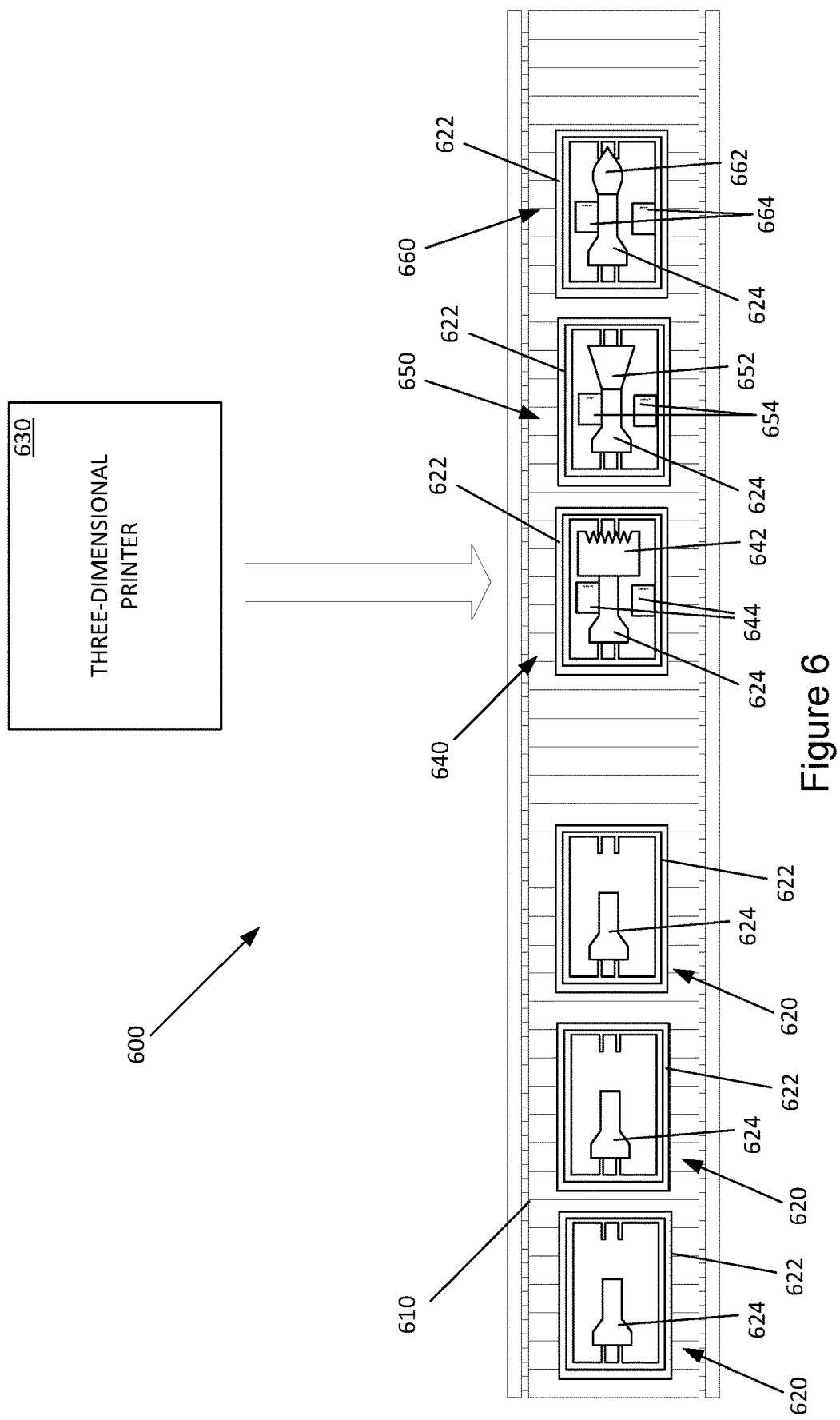
FIG. 6 illustrates another example system for mass production of a product with a customized component.

Referring now to FIG. 6, another example system for mass production of a product with a customized component is illustrated. The example system 600 is similar to the example system 500 described above with reference to FIG. 5. In the example system 600, a first assembly phase includes providing of a set of standardized components 620. The standardized components 620 may be similar to the standardized component described above with reference to FIG. 2, but additionally include a portion of the customized part 624. Another portion of the customized part 642, 652, 662 is formed or provided in a later phase of the assembly.

For example, as described above with reference to the set of customized components 300 of FIG. 3, each customized component 310, 320, 330 may have a common handle portion 314, 324, 334 and a unique portion 312, 322, 332. In the example system 600 of FIG. 6, the common handle portion 314, 324, 334 may be provided as a part of the standardized component 620. Thus, the standardized component 620 includes a packaging framework and a portion of the customized part.

Figure 7:
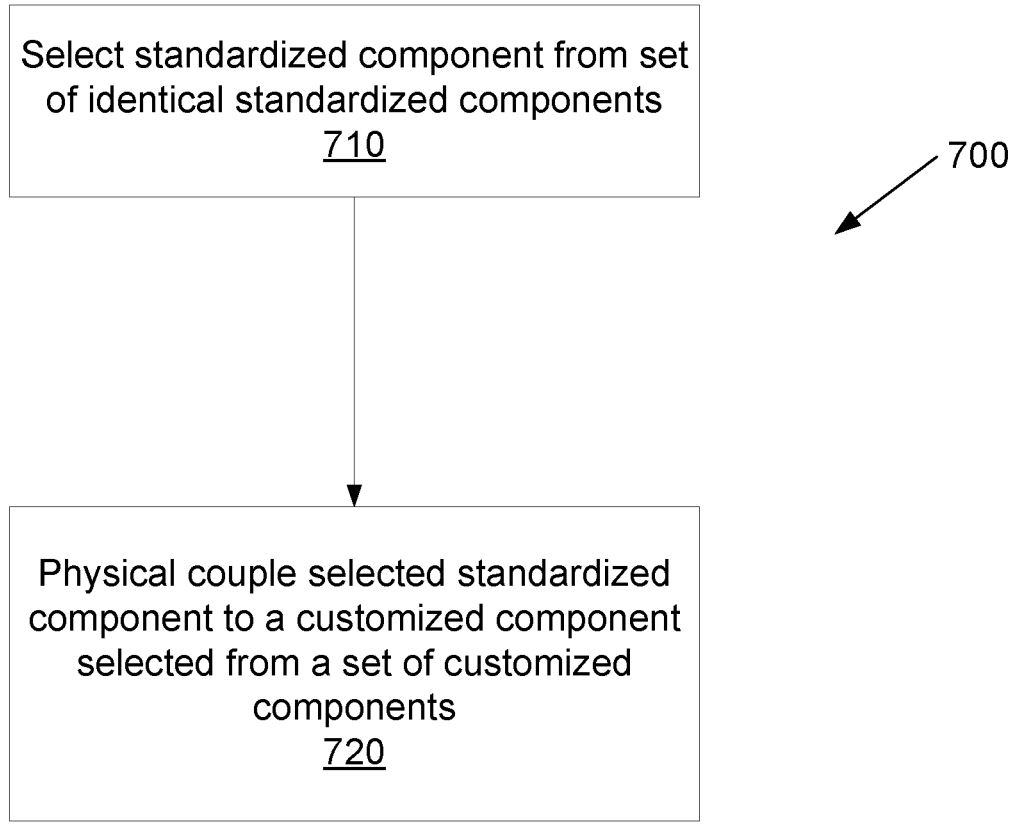
FIG. 7 is a flow chart illustrating an example process for mass production with a customized component.

Referring now to FIG. 7, a flow chart illustrates an example process for mass production with a customized component. As noted above with reference to the example of FIG. 5, the formation of the assembled products in accordance with the example process 700 of FIG. 7 may be performed without any specific sequence. For example, a 3D printing process may be used to simultaneously or iteratively print layers of the standardized components and the appropriate customized component.

The example process 700 includes selecting a standardized component from a set of standardized components (block 710). As described above, each standardized component of the set of standardized components is substantially identical to one another. The example process 700 further includes physically coupling a customized component to the selected standardized component (block 720). The customized component is from a set of customized components. Each customized component of the set of customized components is selected from at least two different custom options. The customized component further includes at least a first portion of a customized part and an associated descriptor. As described above, the descriptor may include a variety of types of information or images. Further, as described above, the customized component may be formed using a 3D printing process.

Thus, in accordance with various examples described herein, customization may be provided in a mass production system without the need to remove the product from the mass production system.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. An assembly line, comprising:
   a standardized production portion of the assembly line, the standardized production portion comprising a three-dimensional printer to produce a set of standardized components, each standardized component of the set of standardized components being substantially identical to one another; and
   a customized production portion of the assembly line, the customized production portion comprising a three-dimensional printer to produce a set of customized components, each customized component of the set of customized components having a different custom option, the each customized component of the set of customized components including at least a first portion of a customized part and an associated descriptor, wherein:
   the each standardized component comprises a packaging for the each customized component and an interface feature to physically couple the each customized component to the each standardized component; and
   the each customized component is physically coupled to the each standardized component.

2. The assembly line of claim 1, wherein the each standardized component is a production framework to secure the each customized component during production.

3. The assembly line of claim 1, wherein the standardized production portion is a three-dimensional printer.

4. The assembly line of claim 1, wherein the associated descriptor includes at least one of trademark information, patent information, warranty information, a collector card, reward information and safety information.

5. The assembly line of claim 1, wherein at least a second portion of the customized part is similar to a second portion of another customized part.

6. The assembly line of claim 1, wherein the packaging includes at least one fitting for automation in at least one of production, shipping and finishing.

7. The assembly line of claim 1, wherein at least one customized component of the set of customized components includes a supplemental customized part associated with the at least one customized component or the standardized component.

8. The assembly line of claim 7, wherein the supplemental customized part is a test equipment of an attachment for the customized part.

9. The assembly line of claim 1, wherein the associated descriptor is physically coupled to the each standardized component.

10. A device, comprising:
    a standardized component, wherein the standardized component comprises a packaging for a customized component;
    an interface feature formed on the standardized component to physically couple the standardized component to the customized component; and
    the customized component physically coupled to the standardized component, the customized component including a first portion of a customized part and an associated descriptor,
    wherein the device is a three-dimensional printed device that comprises the standardized component, the customized component, and the associated descriptor.

11. The device of claim 10, wherein the associated descriptor includes at least one of trademark information, patent information, warranty information, a collector card, reward information and safety information.

12. A method, comprising:
    three-dimensionally printing a standardized component from a set of standardized components, each standardized component of the set of standardized components being substantially identical to one another;
    three-dimensionally printing a customized component, wherein the standardized component comprises a packaging for the customized component and an interface feature to physically couple the customized component to the standardized component; and
    physically coupling the three-dimensionally printed customized component to the three-dimensionally printed standardized component via the interface feature of the standardized component, the interface feature comprises multiple interface positions, the customized component being from a set of customized components, each customized component of the set of customized components having a different custom option, the customized component including at least a first portion of a customized part and an associated descriptor.

13. The method of claim 12, wherein the physically coupling includes forming the customized component via three-dimensional printing.

14. The method of claim 12, wherein the associated descriptor includes at least one of trademark information, patent information, warranty information, a collector card, reward information and safety information.

15. A method comprising:
    three-dimensionally printing a standardized component from a set of standardized components, each standardized component of the set of standardized components being substantially identical to one another;
    three-dimensionally printing a customized component, wherein the standardized component comprises a packaging for the customized component and an interface feature to physically couple the customized component to the standardized component; and
    physically coupling the customized component to the selected standardized component via the interface feature of the standardized component, the customized component being from a set of customized components, each customized component of the set of customized components having a different custom option, the customized component including at least a first portion of a customized part and an associated descriptor,
    wherein the customized component is three-dimensionally printed in a cavity of the standardized component.

16. A method comprising:
    three-dimensionally printing a standardized component from a set of standardized components, each standardized component of the set of standardized components being substantially identical to one another;
    three-dimensionally printing a customized component, wherein the standardized component comprises a packaging for the customized component and an interface feature to physically couple the customized component to the standardized component; and
    physically coupling the customized component to the selected standardized component via the interface feature of the standardized component, the customized component being from a set of customized components, each customized component of the set of customized components having a different custom option, the customized component including at least a first portion of a customized part and an associated descriptor,
    wherein the standardized component and the customized component are simultaneously printed.

* * * * *